(12) United States Patent
Karaoguz et al.

(10) Patent No.: US 9,374,609 B2
(45) Date of Patent: Jun. 21, 2016

(54) REMOTE CONTROL DEVICE TRANSACTION SETUP IN A HOME NETWORK

(71) Applicant: BROADCOM CORPORATION, Irvine, CA (US)

(72) Inventors: Jeyhan Karaoguz, Irvine, CA (US); Stephen Ray Palm, Irvine, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/158,586

(22) Filed: Jan. 17, 2014

(65) Prior Publication Data

US 2014/0137167 A1   May 15, 2014

Related U.S. Application Data

(63) Continuation of application No. 12/343,599, filed on Dec. 24, 2008, now abandoned.

(51) Int. Cl.

| | | |
|---|---|---|
| *H04N 21/436* | (2011.01) | |
| *H04N 21/41* | (2011.01) | |
| *H04N 21/4363* | (2011.01) | |
| *H04N 7/10* | (2006.01) | |
| *H04L 29/08* | (2006.01) | |
| *H04L 12/28* | (2006.01) | |
| *H04N 21/214* | (2011.01) | |
| *H04L 29/06* | (2006.01) | |

(52) U.S. Cl.
CPC ........ *H04N 21/4126* (2013.01); *H04L 12/2805* (2013.01); *H04L 12/2838* (2013.01); *H04L 67/025* (2013.01); *H04L 67/12* (2013.01); *H04N 7/106* (2013.01); *H04N 21/2143* (2013.01); *H04N 21/436* (2013.01); *H04N 21/4363* (2013.01); *H04N 21/43615* (2013.01); *H04N 21/43632* (2013.01); *H04N 21/43637* (2013.01); *H04L 65/4084* (2013.01)

(58) Field of Classification Search
CPC .................... H04N 21/2143; H04N 21/43615; H04N 21/436; H04N 21/4363; H04N 21/43632; H04N 21/43637
See application file for complete search history.

(56) References Cited

U.S. PATENT DOCUMENTS

| | | | | |
|---|---|---|---|---|
| 6,445,306 | B1 * | 9/2002 | Trovato et al. ............. | 340/12.25 |
| 6,760,671 | B1 * | 7/2004 | Batcher ................. | H04B 1/715 |
| | | | | 370/342 |
| 7,234,115 | B1 * | 6/2007 | Sprauve .................. | H04L 12/66 |
| | | | | 715/744 |
| 2004/0143622 | A1 * | 7/2004 | Hirabayashi ........ | H04L 12/5692 |
| | | | | 709/200 |

(Continued)

*Primary Examiner* — Robert Hance
(74) *Attorney, Agent, or Firm* — Garlick & Markison; Randy Lacasse

(57) ABSTRACT

A technique of using a remote control device to identify a source for transferring content on a home network, a renderer for rendering the content and a pathway within a home network to couple the source to the renderer to transfer the content. The remote control device then transmits control information to the source to set a control parameter value within the source to send the content and transmits control information to the renderer to set a control parameter value within the renderer to receive the content. The commands from the remote configure parameter values associated with a media layer in the source and/or the renderer to initiate a hand-shake to effect the content transfer, so that the source and the renderer need not initiate the hand-shake between themselves.

19 Claims, 6 Drawing Sheets

(56) References Cited

U.S. PATENT DOCUMENTS

| | | | |
|---|---|---|---|
| 2004/0209635 A1* | 10/2004 | Hsu | H04W 52/20 455/522 |
| 2005/0063355 A1* | 3/2005 | Iwamura | H04B 3/542 370/351 |
| 2007/0079321 A1* | 4/2007 | Ott, IV | 725/18 |
| 2007/0107020 A1* | 5/2007 | Tavares | 725/81 |
| 2007/0277205 A1* | 11/2007 | Grannan | 725/80 |
| 2008/0092194 A1* | 4/2008 | Kim et al. | 725/131 |
| 2008/0098452 A1* | 4/2008 | Hardacker | H04N 21/25808 725/153 |
| 2008/0120683 A1* | 5/2008 | Frazier | H04L 12/66 725/141 |
| 2008/0155624 A1* | 6/2008 | Yoon et al. | 725/109 |
| 2008/0229370 A1* | 9/2008 | Zustak et al. | 725/78 |
| 2008/0291864 A1* | 11/2008 | Chang | 370/316 |
| 2008/0320536 A1* | 12/2008 | Kim et al. | 725/109 |
| 2009/0089850 A1* | 4/2009 | Nakajima et al. | 725/118 |
| 2009/0141692 A1* | 6/2009 | Kasslin | H04W 48/16 370/338 |
| 2009/0265737 A1* | 10/2009 | Issa et al. | 725/38 |
| 2009/0303197 A1* | 12/2009 | Bonczek | G06F 3/0486 345/173 |
| 2010/0037274 A1* | 2/2010 | Meuninck et al. | 725/109 |
| 2010/0088735 A1* | 4/2010 | Sadja et al. | 725/109 |
| 2012/0124625 A1* | 5/2012 | Foote et al. | 725/42 |
| 2012/0144424 A1* | 6/2012 | Ganesan et al. | 725/40 |
| 2012/0144426 A1* | 6/2012 | Han et al. | 725/44 |
| 2012/0167125 A1* | 6/2012 | Grubb | 725/14 |
| 2012/0167137 A1* | 6/2012 | Wong et al. | 725/38 |
| 2012/0192227 A1* | 7/2012 | Fleischman et al. | 725/34 |
| 2012/0210383 A1* | 8/2012 | Sayers et al. | 725/116 |

\* cited by examiner

REMOTE CONTROL DEVICE TRANSACTION SETUP IN A HOME NETWORK

CROSS-REFERENCE TO A RELATED APPLICATION

The present U.S. Utility patent application claims priority pursuant to 35 U.S.C. §120, as a continuation of U.S. Utility patent application Ser. No. 12/343,599, entitled "Remote Control Device Transaction Setup in a Home Network," filed Dec. 24, 2008, which is hereby incorporated herein by reference in its entirety and made part of the present U.S. Utility patent application for all purposes.

BACKGROUND OF THE INVENTION

1. Technical Field of the Invention

The present invention relates generally to communication systems and, more particularly, to delivery of multimedia content across different platforms that are made interoperable through a network, such as a home network.

2. Description of Related Art

Content connectivity in a residence or office environment is becoming more attractive to simplify the way information is controlled and delivered. As more residences are built to accommodate a digital environment (digital home), the prior practice of having many different systems that operate independently from one another is undesirable for a number of reasons. In a typical home, a variety of electrical devices are present, but most of these devices operate independently from one another. For example, a television system that typically includes one or more displays, a digital video recorder (DVR) and/or a digital video disc (DVD) recorder/player, and which may also include a converter (generally known as a set-top box) may form one system. A television system in a home is typically connected together by a coaxial cable which runs through the home. Another system which may be present in a home is a telephone system, in which one or more telephone units are distributed throughout the house. A home telephone system may be wired or wireless or a combination of the two. Still another system typically found in a home is a computer system, in which one or more computers are connected to various peripherals, such as printers, cameras, compact disk (CD) or DVD players, mass storage units, routers, etc. Typically, various components of a home computer system are tied together by a router and/or a server through a wired local area network (LAN), a wireless LAN (WLAN) or a combination of both wired and wireless local area network, as well as other connectivity. Further, the home computer network is coupled to external networks, such as the Internet, through cable modem connections, DSL (Digital Subscriber Line) modem connections, telephone connections and/or microwave (e.g. satellite) connections, as well as other connections.

In an existing home, many of these systems operate independently from one another and complications are well noted in trying to bridge content from one system to another. For example, a digital photo may be readily transferred to a computer from a camera, so that a photo may be printed from a printer connected to the computer, but it is typically not possible to transfer the photo for display onto a television set. Likewise, a movie that may be played from a DVD player of a notebook computer may be watched on the notebook display, but that same movie cannot be watched on a television set in the home, unless the DVD is transferred to a DVD player connected to the television set or the notebook video output is connect to the television set.

More recently, a concept for an integrated digital home has emerged in order to tie together the various digital systems in a home. By developing an interoperable network to integrate both wired and wireless platforms, content may be delivered across these different platforms and shared seamlessly by devices coupled to the interoperable network. For example, personal computers (PCs), consumer electronics (CEs) and mobile devices, such as cellular telephones (cell phones), personal digital assistants (PDAs) and mobile multimedia devices (e.g. portable MP-3 players) may transfer content among themselves with minimal or no effort from the person wanting the content.

One entity which is attempting to form a cross-industry convergence of platforms is the Digital Living Network Alliance (DLNA). The various platforms, such as set-top boxes (STBs), PCs, DVD players, gaming machines, MP-3 players, Blue Ray™ players, mobile phones, personal media players, as well as others, may be integrated using one or more connectivity, such as multimedia over cable (MoCA) wired connection, Wi-Fi wireless connection, Ethernet wired LAN connection, Bluetooth wireless connection, Blue-Fi wireless connection, optical connectivity and powerline connectivity, as well as others. Once these various systems are tied together for seamless content sharing in a home network, content obtained from one platform may be transferred seamlessly to another platform using some form of connectivity.

Once the interoperable system is available in a home, the content to and/or from the various platforms may be manipulated in a variety of ways. This is possible, since a previously passive device, such as a television set, is now coupled to a processing device, such as a PC or a cell phone, so that additional computational power is now available to control content delivery to the passive device, or to other devices. Thus, new techniques to exploit this interoperability across platforms may be implemented to further control or enhance content delivery.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION

The embodiments of the present invention may be practiced in a variety of settings that utilize an integrated home network. The term "home network" is used herein for explanatory purpose only in order to simplify the description below. The invention is applicable to a variety of multimedia networks and the multimedia network need not be limited to a residence-based network. The described home-based network or "home network" may be implemented as a multimedia network in other types of premises or buildings, both commercial and non-commercial, as well as across several sites that may not be contiguously connected.

Figure 1:
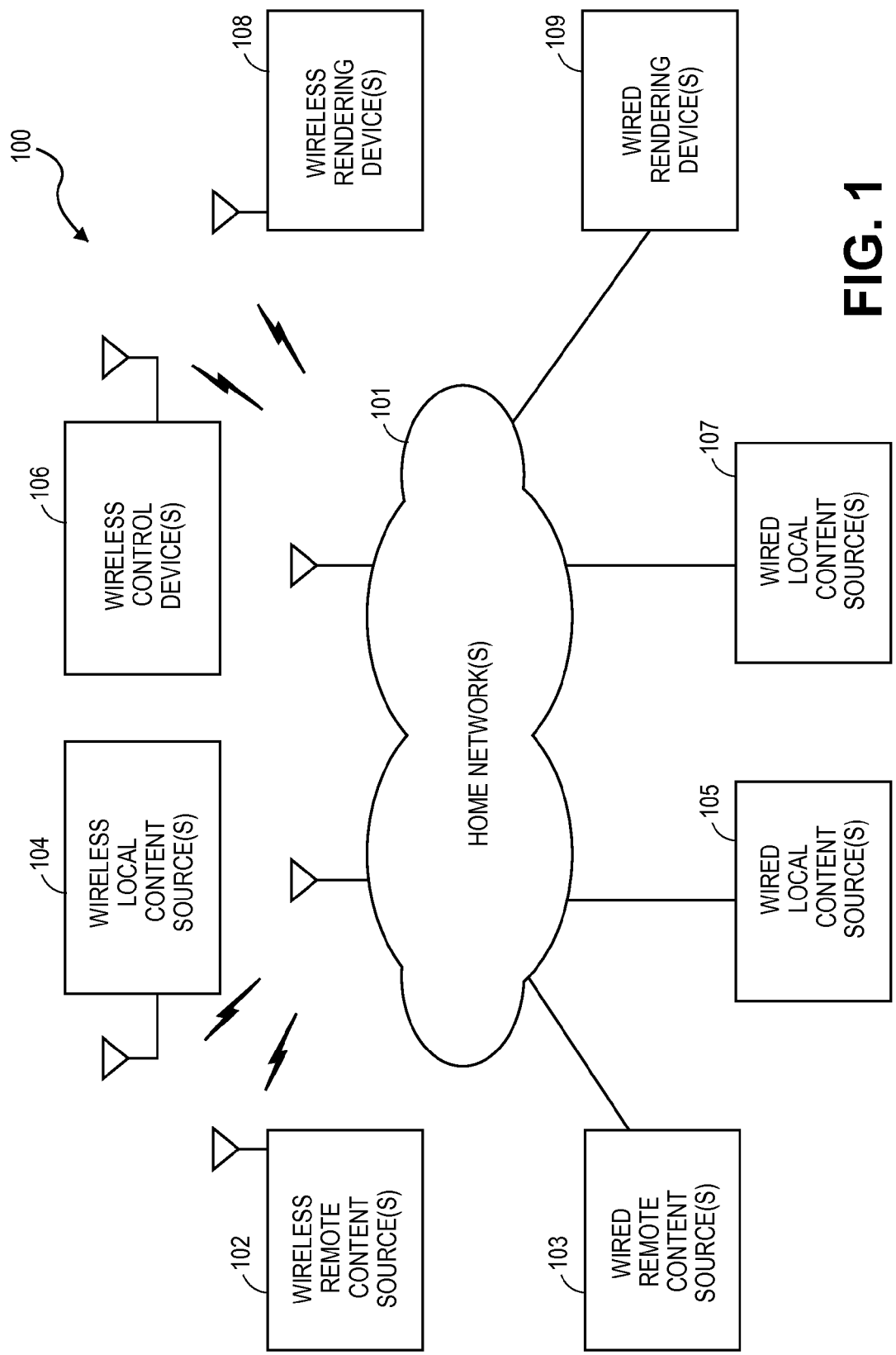
FIG. 1 is a block diagram showing an exemplary home network system for implementing an embodiment of the invention.

FIG. 1 shows a system 100 in which a variety of devices are coupled to a home network 101. Home network 101 may comprise one network or multiple networks, but for simplicity only the singular is used in the description of FIG. 1. Furthermore, as noted above, home network 101 may be any type of network that transports ordinary data, multimedia data or other information and need not be confined to a residence (e.g. home). The transfer of data may be serial, parallel, packet, non-packet, streaming, etc. The format may vary depending on the particular network or system. Home network 101 may be a wired network, wireless network or a combination of the two.

As shown in FIG. 1, a variety of wired and/or wireless devices are coupled to home network 101. FIG. 1 exemplifies the various devices that may couple to home network 101 and it is to be noted that some systems may have less devices coupled to the home network 101 than shown or more devices than shown. In the particular example, home network 101 may couple to one or more remote content source(s). The remote content source is usually located external to the "home" and is accessed by home network 101 through some communication pathway that connects to the remote content provider. In the shown example, home network 101 couples to one or more wireless remote content source(s) 102 through a wireless communication pathway, while home network 101 couples to one or more wired remote content source(s) 103 through a wired communication pathway.

As an example, one wireless remote content source may be a content provider of satellite programs where movies and television programming may be transmitted to home network 101 through satellite communication channels. A cellular telephone channel is another example in which content is provided to home network 101 by wireless means. An example of a wired connection to a wired remote content source is a cable link from home network 101 to a television programming provider, which may also provide movies for viewing. A wired Internet connection is another example, in which the wired connection of home network 101 to the Internet allows various content to be delivered from one or more remote source(s) to home network 101. Telephone land lines are another example of a wired connection that may be used. These are just some of the examples of remote content sources and the invention is not limited to the described examples.

Home network 101 may also couple to one or more wireless local content source(s) 104 and/or one or more wired local content source(s) 105. The local content sources 104, 105 may provide a variety of content and some of the content may be the same or similar to the content provided from remote content sources 102, 103. The difference is that the local content is sourced proximal to home network 101, so that external connection is not generally required to access the local content. An example of wired local content source 105 is a hard disk drive or a DVD/CD player of a personal computer (PC) or a server that couples to home network 101 by a LAN connection, such as an Ethernet connection. Another example of a wired local content source is a DVR device or a DVD player that couples to a television through home network 101. An example of wireless local content source 104 is a portable notebook computer that couples to home network 101 by wireless means, such as Wi-Fi, or Bluetooth™, or Blue-Fi. Another example of a wireless local content source is a cell phone or portable multimedia player that stores content (such as music) and has the capability to communicate with home network 101 to transfer content to home network 101. Again, these are examples only and should not be read to limit the invention. A variety of other local content sources, both wired and wireless, may be implemented for use with home network 101.

The content that is being transported on home network 101 from one or more of the sources 102-105 has a destination to which the content is rendered. Content is rendered when the content is made available to a renderer, which typically is a device that uses or operates on the delivered content. In the example of FIG. 1, home network 101 may be coupled to one or more wireless rendering device(s) 108 and/or wired rendering device(s) 109. Examples of wired rendering devices include, television displays, computer displays, audio speakers and headphones, wired printers, etc. Examples of wireless rendering devices include wirelessly connected printers, speakers, headsets, handheld displays, etc. These are just some examples of wired and wireless rendering devices and the invention is not limited to just these devices.

Also shown coupled to home network 101 are one or more wireless control device(s) 106 and or one or more wired controlled device(s) 107. It is to be noted that some processing intelligence is coupled to home network 101 to ensure proper operation of home network 101 in content delivery. In the example system 100, a wireless control device or a wired control device, or a combination of both, may provide operational control of portions or devices on home network 101. In some instances, one control device may provide full control of all content transport within home network 101 or the responsibility for content transfer may be divided among multiple units. Examples of control devices for either wireless control device(s) 106 or wired control device(s) 107 include, PCs, notebook computers, server computers, set-top boxes, handheld remotes and cell phones. These are just some examples and it is noted that other devices may be used as control devices as well, as noted in the description below.

System 100 is an illustrated example of a home network system in which contents are sourced, either locally or remotely, to one or more rendering devices. The various devices may communicate by wired or wireless means with home network 101. One or more control devices may be present to control home network 101 or control the transfer of the content from the content source to the rendering device (which is also referred to as a renderer herein). In some instances, a control device (such as control device 105, 106) may be part of (e.g. built into) the content source or the renderer. For example, when the content is stored in a computer, such as a PC, the PC may also serve as the control device. Likewise, if a set-top circuitry is built into a television set, then the television set may both be the renderer and the control device. Thus, system 100 is shown as an example only and other systems may be used to practice the invention.

Figure 2:
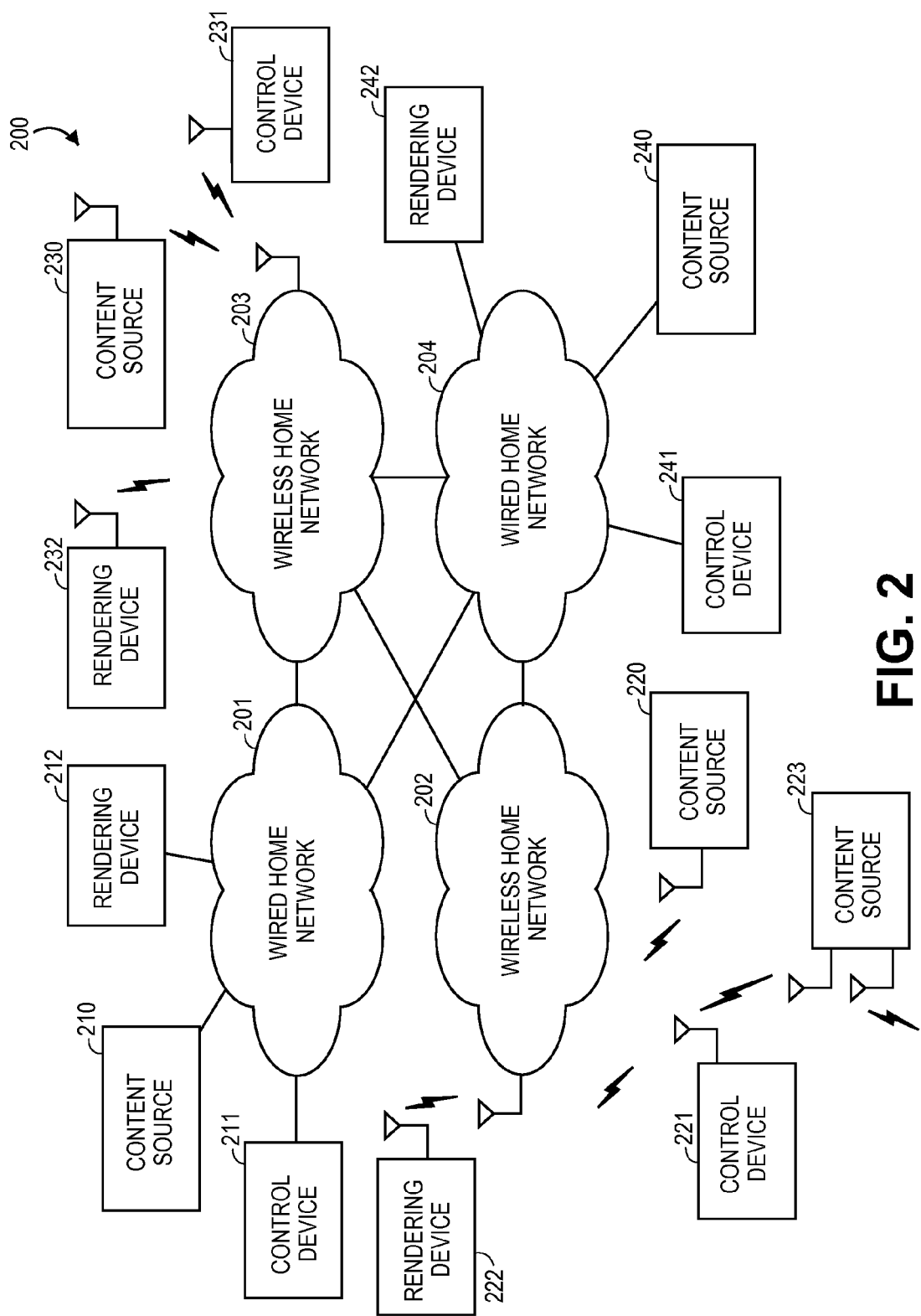
FIG. 2 is a block diagram showing another exemplary home network system having multiple networks for implementing an embodiment of the invention.

FIG. 2 is another example of a home network system 200 in which multiple home networks are present within a premise. Two home networks 201, 204 are wired while two home networks 202, 203 are wireless. The actual number and type (wired or wireless) of networks may vary from system to system. The four home networks 201-204 are inter-coupled so that in some embodiments, content may be transferred across networks. Content source 210, control device 211 and rendering device 212 are coupled to wired home network 201 by wired means. Likewise, content source 240, control device 241 and rendering device 242 are coupled to wired home network 204 by wired means. Content source 220, control device 221 and rendering device 222 are coupled to wireless home network 202 by wireless means. Likewise, content source 230, control device 231 and rendering device 232 are coupled to wireless home network 203 by wireless means. An additional content source 223 is shown also coupled to home network 202. As noted with system 100 of FIG. 1, some embodiments may not have all of the noted devices, while others may have more devices. What is to be noted is that various wired and/or wireless content source, rendering and control devices are coupled to a multi-network system.

The various devices that are coupled to the networks 201-204 operate equivalent to the respective devices noted for system 100 in FIG. 1. Thus, each content source 210, 220, 223, 230, 240 represents a remote content source, local content source, or both local and remote (as noted in FIG. 1). Content source 223 is shown having multiple antennas to indicate that multiple-input, multiple-output (MIMO) communication protocol may be used as well for wireless communications. The wired and/or wireless networks may be of the same platform or may be of different platforms. For example, in one embodiment, wired home network 201 may be a wired local area network (LAN), such as an Ethernet network, that allows computers to be coupled to various peripheral device; wireless home network 202 may be a Wi-Fi network within a premise, such as Wi-Fi that implements 802.11a/b/g protocol or the 802.11n MIMO protocol; wireless home network 203 may be a Bluetooth™ or Blue-Fi network; and wired home network 204 may be a wired telephone network, a coaxial cable network (such as the aforementioned MoCA), optical network or a powerline network (such as the HomeGrid connectivity) that distributes audio, video and/or multimedia signals. In these instances, devices of corresponding platforms are coupled to a respective home network 201-204. Again, other embodiments may have different networks and connectivity. What is to be noted is that devices of different platforms may be coupled to corresponding networks and the networks are interoperably coupled together to operate as a home system. It is to be noted that some devices may have the capability to operate within more than one network. For example, a laptop or notebook computer may be coupled to various corresponding network by a wired LAN or coaxial connection, as well as having Wi-Fi (or Wi-Max) capability to connect wirelessly. The notebook computer may also have Bluetooth capability as well.

Figure 3:
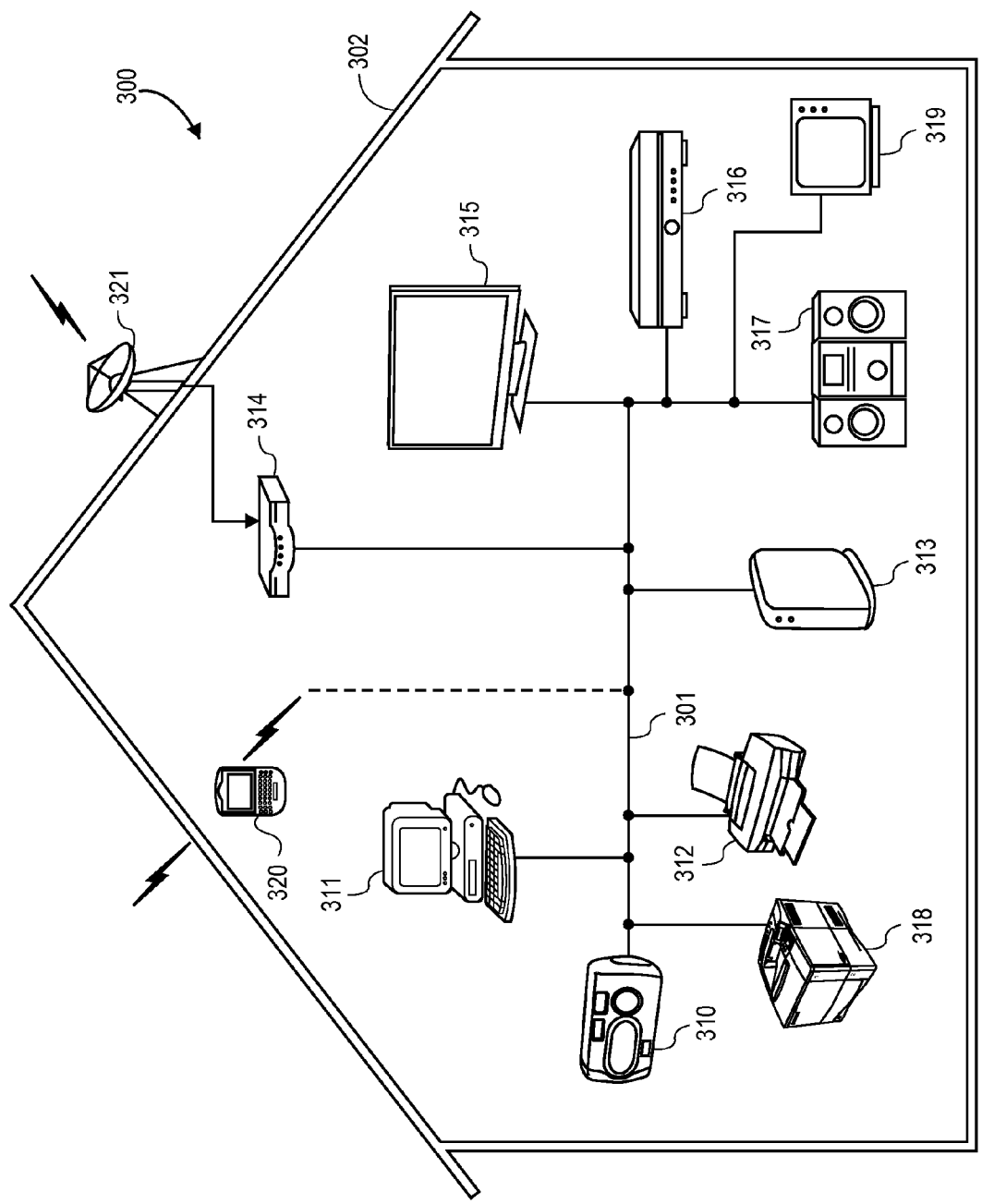
FIG. 3 is a pictorial example illustration showing various home devices that are coupled together in a home network.

FIG. 3 shows an example of a home system 300 having a home network 301 within a premise 302, such as a home. Although a single communication path is shown for network 301, it is to be noted that the above-described examples of home network 101 or multiple home networks 201-204, as well as other embodiments using wired and wireless connectivity, may be employed for home network 301. Various devices 310-319 are also shown coupled to home network 301. Devices 310-319 exemplify different types of content source, control and rendering devices that may be found in a home environment. Although a line is shown coupling devices 310-319 to home network 301, it is understood that devices 310-319 represent devices that may operate wired, wireless or both, in accordance with the description of devices of FIGS. 1 and 2. Furthermore, devices 310-319 may operate within the same platform or may operate in different platforms, but made inter-operable by the home network or networks.

In the particular example of system 300, device 310 is a digital camera, device 311 is a desktop PC (or alternatively a notebook computer), device 312 is a printer, device 313 is a network storage medium, device 314 is a modem (or alternatively a set-top box), device 315 is a television display, device 316 is a DVR or DVD recorder/player, device 317 is an audio recorder/player, device 318 is another printer and device 319 is another video display or television. These particular devices are presented here as an example only and, in other embodiments, different devices may be coupled to home network 301. As noted, modem 314 couples to a satellite dish 321 to reach a remote content source through satellite communication channels. Modem 314 could be a cable modem which communicates with a remote content source (such as a cable provider). Internet connection through modem 314 also allows system 300 to communicate with a remote content source through the Internet.

As noted above, some of the devices of system 300 may operate strictly in one capacity as a content source, control unit or renderer, while other devices may have multiple roles. For example, PC 311 may operate as a source when providing a PC stored content. It may also operate as a renderer when displaying photographs sent from camera 310, in which case camera 310 would be the source of the content. PC 311 may also operate as a control device in controlling the transfer of content from camera 310 to printer 312 for printing a photograph. In this instance, printer 312 would be the renderer. Again, in some embodiments, the control function may reside in the source or in the renderer, so that a separate control unit may not be needed.

FIG. 3 also shows a wireless device 320, such as a mobile telephone (e.g. a cellular telephone) or digital media device (or alternatively a remote control unit) that couples to home network 301. As a mobile telephone or digital media device, wireless device 320 may connect to a remote content source or as a remote control unit, may control the transfer of content from a source device to a rendering device. Device 320 may perform both functions as well. As described below, wireless device 320 may operate as a remote control device to select and set up a content source and a renderer in order to deliver content to the selected rendering device.

In the particular example, the content that resides on the various devices or is loaded onto a device (such as by insertion of DVD or CD disks) are regarded as local content, since the content resides within premise 302. Content obtained remotely from sources external to premise 302 through pathways, such as satellite, microwave, cable or publicly switched telephone connection is regarded as remote content. In some instances, local content may have been previously obtained from a remote source as remote content and subsequently made available as local content. The described home network may operate within and/or be compatible with networks specified under the Digital Living Network Alliance (DLNA), as well as others.

Figure 4:
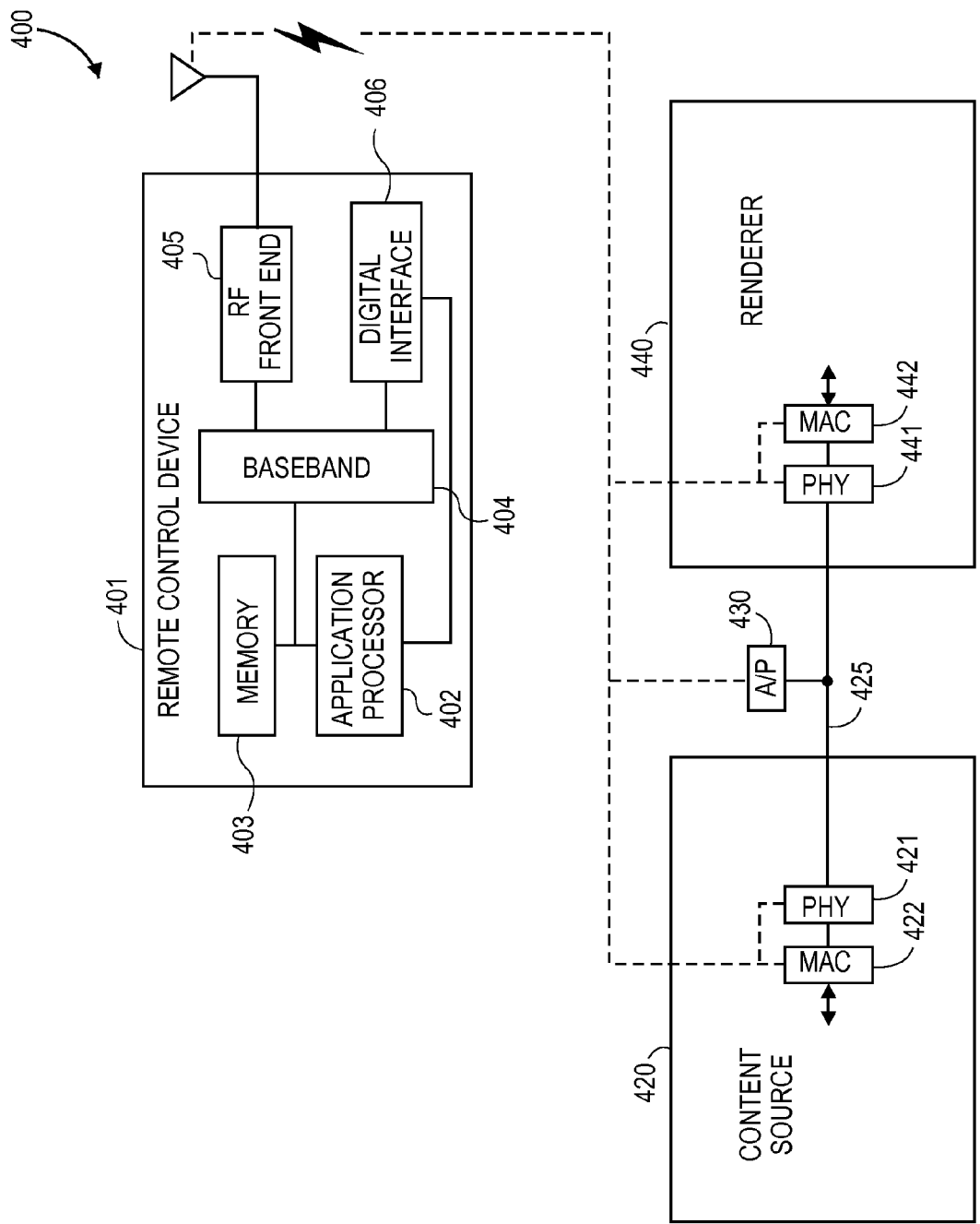
FIG. 4 is a block diagram showing a remote unit that is used to control transfer of content from a source and to control a rendering device to receive the content.

FIG. 4 illustrates how the various devices that communicate through home network 301 function within premise 302 in rendering a selected content on a selected renderer. The example is applicable to the home network(s) of FIGS. 1 and 2 as well. In FIG. 4, a particular selected content is sourced from a content source 420 and communicated onto home network 425 to be rendered by a device 440. The content may be selected by various means, but generally, the content is identified by a user for rendering. For example, the content may be a photograph stored in a camera, in which the photograph may be rendered on a video display for viewing or sent to a printer for printing. In another example, the sourced content may be a movie on a DVD disc or a downloaded movie that is to be rendered on a television set or on a computer display monitor. The sourced content may be local content or remote content.

In example system 400 of FIG. 4, remote control device 401 (hereinafter simply referred to as a "remote") controls selection of the content from a particular source (in this instance, source 420) for rendering on a selected renderer (in this instance, renderer 440). For example, a user may select to watch a movie from a DVD disk loaded into a DVD player (such as device 316). In another example, a user may choose a photograph stored in camera 310 for viewing or printing. In some instances, there may be automated selection for choosing a particular content. For any of a variety of reasons, a content is selected from a source having the content for rendering by a selected rendering device. The content is sourced onto home network 425 to transfer the content for rendering.

Home network 425 may be a single network or a plurality of networks. Home network(s) described in reference to FIGS. 1 and 2 may be readily implemented for home network 425. A variety of control devices, including those control devices of FIGS. 1-3, may be used as remote 401. Remote 401 may be coupled to home network 425 by wired means, but for purposes of mobility, remote 401 is typically wirelessly coupled to home network 425. In one embodiment remote 401 couples to home network 425 through an access point (A/P) 430. In another embodiment, remote 401 couples wirelessly to devices coupled onto home network 425, such as content source 420 and/or renderer 440. What is to be noted is that remote 401 may couple to content source 420 directly or may couple to content source 420 through home network 425, via some means, such as A/P 430 or another device coupled to home network 425. Likewise, remote 401 may couple to renderer 440 directly or may couple to one or more renderers through home network 425, via some means, such as A/P 430 or another device coupled to home network 425. By having remote 401 coupled to home content source 420 and renderer 440 (either directly or indirectly), remote 401 may control how the particular selected source and/or the particular selected renderer may be set for the content transfer.

As noted above, the content may be selected by a variety of means. The content selection may be through an automated response or it may be through user input. In the particular example, remote 401 is used, not only to select the content, but also to control settings in the source and/or the renderer to effect the content transfer. A variety of remote control devices and/or circuitry may be implemented and one example is shown in FIG. 4. In one embodiment, remote 401 includes an application processor 402, baseband processor (which may be a digital signal processor, DSP) 404, and RF front end 405. A digital interface 406 may be included for wired connection to home network 425 or to devices coupled to home network 425. A memory 403 may be included as well for storing of program instructions and/or data.

Furthermore, in some embodiments, an encoding and decoding circuitry (not shown) may be included to provide encoding/decoding functions. Likewise, in some embodiments, an encryption and decryption circuitry (not shown) may be included to provide encryption/decryption functions. Baseband processor 404 generally provides baseband operations at the digital level and RF front end 405 provides RF (radio frequency) conversion for transmitting and receiving RF signals. Baseband and RF front end operations in wireless devices are generally understood.

In one embodiment, remote 401 performs operations described below by use of applications processor 402. Software that has program instructions to perform these described actions reside within control device 401, such as in memory 403, to operate with application processor 402. The software may have been pre-loaded into remote 401, may have been resident on a machine readable medium at one point and loaded into remote 401, or even downloaded from an external source. As shown, memory 403 includes data processing instructions to process data, protocol instructions to set up communication protocol(s), encoding/decoding instructions when those functions are utilized and/or encryption/decryption instructions when those functions are utilized. Memory 403 may include other instructions as well. Furthermore, the various program instructions may be resident in more than one memory device and the program instructions may be resident elsewhere, other than in memory 403.

Application processor 402 then executes program instructions relevant to the operation of remote 401. In other embodiments, some or all of the software functions could be performed in hardware or firmware. What is to be noted is that whatever the structure of remote 401, remote 401 has processing capability to control certain parameters of content source 420, renderer 440 and/or home network 425 to source a given content of source 420 for rendering by renderer 440. Remote 401 is also used to setup control parameters in source 420 and/or renderer 440 to effect the content transfer. In some embodiments, remote 401 may be preloaded or through programmed inquiry, determine the presence of home network 425, source 420 and renderer 440.

In the operation of using remote 401, remote 401 contains information regarding home network 425 and various components that are coupled to home network 425, including the various content sources and renderers for rendering the content, as well as one or more connectivity present to connect the content source to the renderer(s). As noted above, this information may be preloaded into remote 401 or remote 401 may search and find the various connections, such as at start-up when remote 401 is activated. Furthermore, with regard to content sources, remote 401 may also have information about the various content that are accessible for rendering. The user may also provide various inputs to remote 401 to access a content. For example, a user may know that a certain movie is stored in a particular content source and may access the source through remote 401.

Additionally, a variety of other techniques may be used by remote 401 to identify the content. Since much of the content that are used within a home environment includes meta-data to identify the content, in one embodiment remote 401 may access the meta-data associated with the content to characterize the content. For example, movies in digital format have meta-data that identifies the title of the movie, as well as other features associated with the movie. Similarly, audio content, such as songs and music, also have meta-data identifying the title and the artist. For home generated content, such as home videos or photographs, there is meta-data associated with each content. For example, a photograph in JPEG (Joint Photographic Experts Group) format may have an associated title (even if just a frame number) that operates as the meta-data to identify the particular content or may include meta-data as part of the EXIF (Exchangeable Image File) tag. Whatever means is utilized, remote 401 identifies the nature of the content. In some embodiments, remote 401 may also perform a search through multiple content sources to locate the desired content for selection.

Remote 401 is operable to communicate with one or more sources and one or more renderers coupled to home network 425. As shown in the particular example of FIG. 4, remote 401 may communicate with content source 420 and/or renderer 440 directly, in this instance through a wireless connection (shown as a dotted line). Alternatively, remote 401 may communicate with source 420 and renderer 440 indirectly via home network 425, in which connectivity to home network 425 may be obtained via access point 430 or some other device coupled to network 425. A source (such as source 420) providing the selected content is identified and selected and a renderer (such as renderer 440) for rendering the content is also identified and selected. The network or networks (such as home network 425) is also identified and selected as a pathway to couple the selected source to the selected renderer for transfer of the content.

Once the source and the renderer for transferring the particular content are identified, remote 401 then sets parameter values within the source and the renderer to effect the transfer. In regards to FIG. 4, remote 401 sets parameter values to control source 420 and renderer 440 by sending media transport commands to source 420 and renderer 440. The media transport commands to source 420 and renderer 440 sets parameter values that are associated with configuring the media layers in those devices. For example, a media layer that is defined in the Open Systems Interconnect (OSI) model may be configured for a device coupled to the home network by having a media transport command (or commands) issued to that device to set one or more media layer parameter values in that device.

In the example of system 400, remote 401 sends media transport commands to configure the media layers of source 420 and renderer 440. In one embodiment, media transport commands from remote 401 includes physical (PHY) layer commands to configure PHY layers 421, 441 in one or both devices 420, 440 and/or includes media access control (MAC) layer commands to configure MAC layers 422, 442 in one or both devices 420, 440. Generally, PHY layers 421, 441 and/or the MAC layers 422, 442 of both source 420 and renderer 440 are configured so that the content from source 420 may be transferred to renderer 440. Part of this parameter setting of the PHY and MAC layers takes into account the nature of the content that is being transferred. Remote 401 analyzes the data it has obtained regarding the source, renderer and/or the network to determine which path is available and which path is optimum. Remote 401 may also determine which format is desirable for efficient or optimum content delivery. For example, for certain data transfer, single data stream transfer may be acceptable. However, for high resolution video, a MIMO path may be more desirable, if a MIMO capability is present. Then, remote 401 provides the necessary transport commands to establish the hand-shake (such as by setting the above-described media layer parameter values) between source 420 and renderer 440, instead of source 420 and renderer 440 themselves establishing the hand-shake. It is to be noted that in the above-described embodiments for practicing the invention, the PHY layer and/or the MAC layer of one or more of the devices are set by remote 401 to provide the hand-shake.

As noted above, the various instructions for generating the media transport commands may reside in memory 403 as data processing instructions and/or protocol instructions of remote 401. Where encoding/decoding and/or encryption/decryption are needed, those instructions also may reside within memory 403. Furthermore, in one embodiment, remote 401 may also use a media transport command to set beam forming parameters in the source and/or the renderer so that the source and/or the renderer do not need to set those parameter values on their own. Similarly, when a MIMO system is employed in one or more of the devices, a media transport command may also set MIMO parameter values in the MIMO devices.

Figure 5:
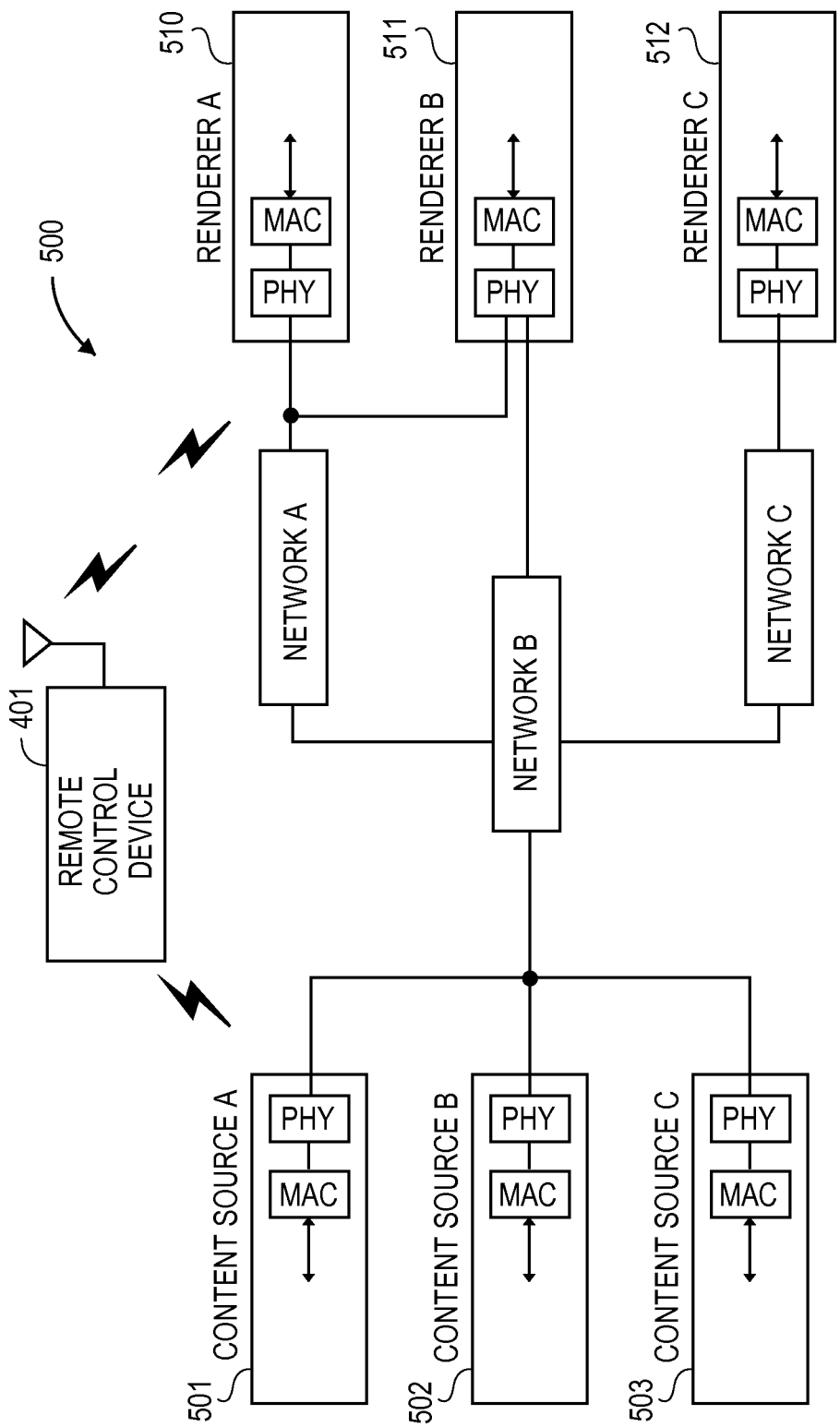
FIG. 5 is a block diagram showing a remote unit that is used to control transfer of content from one or more sources and to control one or more rendering devices to receive the content.

FIG. 5 shows another example embodiment for implementing the invention. In FIG. 5, remote 401 operates within system 500, that includes multiple content sources 501, 502, 503 (also noted as sources A, B, C, respectively) and renderers 510, 511, 512 (also noted as renderers A, B, C, respectively). It is to be noted that the actual number of sources and renderers may vary and that three sources and three renderers are shown in system 500 as an example only. In system 500, three different networks are shown as part of a home network. Again, there may be more or less networks as part of the home network. Network B couples to all three sources A, B, C, as well as to renderer B. Network A and network C are coupled to network B and all three are interoperable as noted with networks in FIGS. 1 and 2. Also, each of the networks may be wired or wireless. Network A couples to renderer A and network C couples to renderer C. As shown, network A also couples to renderer B.

Thus, for system 500, content from sources A, B, C may be coupled to renderer A through a pathway of network B and A, to renderer B through pathway B or pathway B and A, and to renderer C through network B and C. Remote 401, when selecting a particular source A, B, C and particular renderer A, B, C, also selects the pathway within the home network. For example when content provided by source A is to be rendered on renderer B, remote 401 selects a pathway from a plurality of pathways that are available between those two devices. In some embodiments, the pathway chosen is an optimum pathway that is available between the source and the renderer for the particular content that is being transferred. Optimum may be defined in a variety ways, including speed of transfer, particular bandwidth needed, proximity of the rendering device to the remote or user, etc. Furthermore, networks A, B, C may be any type of wired or wireless network, including those networks of FIGS. 1-3.

Furthermore, in other embodiments, content from multiple sources may be rendered on a particular renderer. For example, photos stored at multiple storage locations (content sources) maybe displayed on one rendering device, such as a display. In another embodiment, content from one source may be rendered on multiple renderers. For example, a photo from one storage location (source) to be displayed on a PC and printed by a printer. Yet, in another embodiment, content from multiple sources may be rendered on multiple renderers. For example, photos stored at multiple storage locations being displayed on a PC and also printed by a printer. In these instances, remote 401 identifies the various content(s), corresponding source(s), corresponding renderer(s) and one or more pathways to effect the transfer(s). Accordingly, depending on the particular application, one or more sources may send content to one or more renderers, either through some automatic selection or through user initiated action, such as user selection of a particular renderer from a list of renderers to render the content. A list of sources may be used as well for selection of a particular source of a content. The remote then initiates setting or adjusting the various transfer parameters in the various source(s) and renderer(s).

As shown for system 500, remote 401 sends respective media transport commands to the sources and renderers. Although a direct wireless connection is shown in FIG. 5, it is to be noted that remote 501 may indirectly connect to one or more sources and/or renderers through one or more networks. In this example, media transport commands include MAC layer commands and PHY layer commands to configure the PHY and MAC layers of the source(s) and the renderer(s) that are involved in the data transfer. It is to be noted that various parameter values for the PHY and MAC layers may be controlled or set by the media transport commands from remote 401. For example, in regards to the PHY layer, some of those parameters that may be controlled include, but are not limited to, slot assignment parameters, channel assignment parameters, transmit power allocation parameters, beam forming parameters, MIMO parameters, modulation parameters, coding parameters, etc.

It is to be noted that although MAC and PHY layers are noted in the example, other parameter values may be adjusted in lieu thereof or in addition to configuring the MAC and PHY layers, such as adjusting other LINK layer parameter values. As another example, depending on the content being transferred, bit error rate commands may be sent from remote 401 to set the bit error rate (BER) in the source and/or the renderer. Since a type of data (such as video versus audio; or low-resolution video versus HD video) may dictate a requirement for a particular BER setting, remote 401 may issue instructions for setting a BER parameter in the source and/or renderer.

Figure 6:
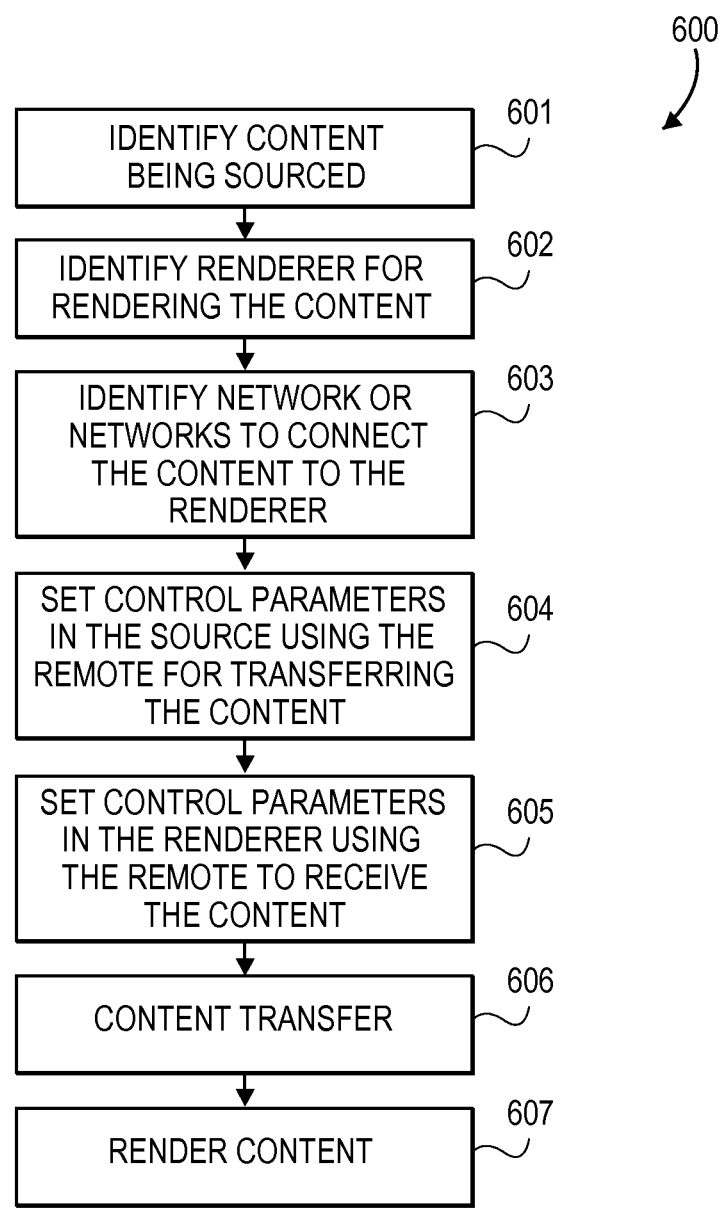
FIG. 6 is flow diagram illustrating one technique of implementing content delivery to a selected rendering device under control of a remote according to one embodiment for practicing the invention.

FIG. 6 illustrates a process 600, which may be executed by the above-described software resident in remote 401 to identify and characterize the content, source of the content, renderer for rendering the content, and the pathway (network(s)) that are available for transferring the content. First, remote 401 identifies the content that is to be transferred, along with the source of the content (block 601). Then, a renderer is identified that may render the content (block 602). Next, one or more networks that are available for establishing a pathway to transfer the content is/are identified and selected (block 603). Next, control parameter values in the source are set by media transport commands from the remote (block 604) and control parameters values in the renderer are set by media transport commands from the remote (block 605). Once the operating parameter values of the source and the renderer are set, along with the pathway to take from the source to the renderer, the content is transferred (block 606) and the content rendered (block 607).

Accordingly, the remote, such as the above described remote 401, may be used to wirelessly control the setting of parameters in the source for sourcing the content and also used to control setting parameters in the renderer for receiving the content for rendering. The remote transmits commands to the source and/or the renderer to effectively establish the hand-shake between the source and the renderer for content transfer. As noted above, one set of commands from the remote may be media transport commands for configuring various media layers, such as the MAC and PHY layers. However, the commands from the remote need not be limited to just controlling MAC and/or the PHY layers. Other media layers may be controlled as well. The transport command(s) may include other parameter value settings that configure the source device(s) and/or the rendering device(s). One noted example is setting the BER for content transfer. The commands form the remote may be sent through a wireless connection, through a wired connection or a combination of both. The commands may be sent directly to the device(s) or indirectly, such as via one or more networks that couple the device(s). In one embodiment, the remote is a wireless device, such as remote 320 and 401 shown in the Figures.

Furthermore, it is to be noted that information regarding the source(s), renderer(s) and/or the network(s) are made available to the controlling remote. The information may be preloaded into the remote, made available by one or more devices coupled to the remote (such as PCs, servers, sources, renderers, etc.) and/or the remote may itself obtain the information, such as at start-up, reset, or through periodic interrogation of the devices within the home network system. Generally, this information is maintained current so that any changes to the various devices are updated and cataloged by the remote. For example, if the remote maintains information about the location of a particular source or renderer, then any location change for a particular source or renderer is updated. The various information are then analyzed when a particular content is to be sent from a source to a render. Where multiple pathways are present, the remote determines which pathway is desirable. Furthermore, the remote may also determine the format of delivery of the content based on the information about the source(s), renderer(s) and network(s) present.

Accordingly, a remote control device transport setup in a home network is described. However, as noted, the invention may be implemented in other premises other than the home environment.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, as used herein, a processing device (or processor) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
    utilizing a wireless device to locate a content present on a content source, in which the content source is one of a plurality of content sources configured to communicate with a local network, the local network including both wireless and wired home communication networks;
    utilizing the wireless device to locate at least one content renderer, including a first renderer that converts content from a storage format to a presentation format, from a plurality of content renderers configured to communicate with the local network;
    utilizing the wireless device to locate a first wireless communication pathway of the local network from the content source to the first renderer;
    utilizing the wireless device to locate at least one other communication pathway of the local network from the content source to the first renderer;
    utilizing the wireless device to select a pathway from the first wireless communication pathway or the at least one other communication pathway to transfer the content from the content source to the first renderer, in which the selected pathway is determined based on the content and one or more characteristics of respective pathways for transferring the content to the first renderer; and
    utilizing the wireless device to transmit media transport commands to the content source and the first renderer to set communication parameters based on the selected pathway for transferring the content, wherein the media transport commands include physical layer commands, media access control layer commands, or both physical layer and media access control layer commands; and
    causing the content to be transferred from the content source to the first renderer over the selected pathway of the local network.

2. The method of claim 1, wherein a portion of the at least one other communication pathway resides in parallel with the first wireless communication pathway.

3. The method of claim 1, wherein the selected pathway is selected based on single data stream transfer and multiple data stream transfer characteristics of the respective pathways for transferring the content.

4. The method of claim 1, wherein the selected pathway is selected based on speed of data transfer characteristics of the respective pathways.

5. The method of claim 1, wherein the selected pathway is selected based on bandwidth characteristics of the respective pathways.

6. The method of claim 1, wherein the selected pathway is selected based on proximity of the first renderer to the content source.

7. The method of claim 1, further including utilizing the wireless device to set a bit error rate for transferring the content when setting the communication parameters.

8. The method of claim 1, further including utilizing the wireless device to set beam forming parameters for transferring the content when setting the communication parameters.

9. The method of claim 1, further comprising utilizing the wireless device to locate a second renderer from the plurality of renderers for rendering the content and respective second set of pathways from the content source to the second renderer capable of rendering the content.

10. An apparatus for wireless communication comprising:
    a processor for executing program instructions to locate a content present on a content source, in which the content source is one of a plurality of content source configured to communicate with a local network, including at least one wireless and one wired network, and to locate at least one content renderer, including a first renderer, from a plurality of content renderers configured to communicate with the local network and further configured to convert content from a storage format to a presentation format, the processor to locate a first wireless communication pathway of the local network from the content source to the first renderer and to locate at least one other communication pathway of the local network from the content source to the first renderer, the processor to further select a pathway from the first wireless communication pathway or the at least one other communication pathway to transfer the content from the content source to the first renderer, in which the selected pathway is determined based on the content and one or more characteristics of respective pathways for transferring the content to the first renderer, and the processor to set communication parameters of the content source and the first renderer based on the selected pathway for transferring the content;
    a radio frequency front end configured with the processor to wirelessly communicate with the plurality of content sources and the plurality of content renderers and to set the communication parameters to have the content transmitted from the content source to the first renderer over the selected pathway; and
    wherein the radio frequency front end transmits media transport commands to the content source and the first renderer to set the communication parameters based on the selected pathway for transferring the content, in which the media transport commands include physical layer commands, media access control layer commands, or both physical layer and media access control layer commands, and causes the content to be transferred from the content source to the first renderer over the selected pathway of the local network.

11. The apparatus of claim 10, wherein a portion of the at least one other communication pathway resides in parallel with the first wireless communication pathway.

12. The apparatus of claim 10, further including a baseband processor configured with the radio frequency front end to provide baseband operations for the apparatus.

13. The apparatus of claim 10, wherein the processor further executes program instructions to locate a second renderer from the plurality of renderers for rendering the content and respective second set of pathways from the content source to the second renderer capable of rendering the content.

14. A method comprising:
    utilizing a wireless device to locate a content present on a content source, in which the content source is one of a plurality of content sources configured to communicate with a home network, the home network including both wireless and wired communication networks;
    utilizing the wireless device to locate at least one content renderer, including a first renderer, from a plurality of content renderers configured to communicate with the home network and further configured to convert content from a storage format to a presentation format;
    utilizing the wireless device to locate a first wireless communication pathway of the home network from the content source to the first renderer;
    utilizing the wireless device to locate at least one other communication pathway of the home network from the content source to the first renderer;

utilizing the wireless device to select a pathway from the first wireless communication pathway or the at least one other communication pathway to transfer the content from the content source to the first renderer, in which the selected pathway is determined based on the content and one or more characteristics of respective pathways for transferring the content to the first renderer;

utilizing the wireless device to set communication parameters of the content source and the first renderer based on the selected pathway for transferring the content, the communication parameters set by transmission of media transport commands to the content source and the first renderer, wherein the media transport commands include physical layer commands, media access control layer commands, or both physical layer and media access control layer commands; and causing the content to be transferred from the content source to the first renderer over the selected pathway of the home network.

15. The method of claim 14, wherein a portion of the at least one other communication pathway resides in parallel with the first wireless communication pathway.

16. The method of claim 14, further comprising utilizing the wireless device to locate a second renderer from the plurality of renderers for rendering the content and respective second set of pathways from the content source to the second renderer capable of rendering the content.

17. The method of claim 14, wherein the first renderer is located within a premise of the home network and the content source is at a location remote from the premise.

18. The method of claim 14, further including utilizing the wireless device to set a bit error rate for transferring the content when setting the communication parameters.

19. The method of claim 14, further including utilizing the wireless device to set beam forming parameters for transferring the content when setting the communication parameters.

* * * * *